United States Patent
Kunii

(10) Patent No.: US 8,821,627 B2
(45) Date of Patent: Sep. 2, 2014

(54) EFFECT PIGMENTS WITH AN OUTER PROTECTIVE COATING COMPRISING ZINC OXIDE

(75) Inventor: Koshiro Kunii, Iwaki (JP)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 13/881,820

(22) PCT Filed: Oct. 12, 2011

(86) PCT No.: PCT/EP2011/005125
§ 371 (c)(1),
(2), (4) Date: Apr. 26, 2013

(87) PCT Pub. No.: WO2012/055493
PCT Pub. Date: May 3, 2012

(65) Prior Publication Data
US 2013/0213260 A1      Aug. 22, 2013

(30) Foreign Application Priority Data

Oct. 27, 2010   (EP) .................................... 10014012

(51) Int. Cl.
| | |
|---|---|
| C09D 11/02 | (2014.01) |
| C04B 14/00 | (2006.01) |
| C08K 5/5425 | (2006.01) |
| C09C 1/00 | (2006.01) |
| C09D 5/36 | (2006.01) |
| C08K 3/22 | (2006.01) |
| C08K 5/5435 | (2006.01) |
| C08K 5/54 | (2006.01) |

(52) U.S. Cl.
CPC ............ *C08K 5/5425* (2013.01); *C09C 1/0024* (2013.01); *C09C 1/0021* (2013.01); *C09C 1/0051* (2013.01); *C09C 2200/102* (2013.01); *C09D 5/36* (2013.01); *C09C 1/0039* (2013.01); *C09C 1/0066* (2013.01); *C08K 3/22* (2013.01); *C09C 2200/409* (2013.01); *C08K 5/5435* (2013.01); *C08K 5/5403* (2013.01); *C09C 2200/407* (2013.01); *C09C 2200/301* (2013.01); *C09C 2200/1004* (2013.01); *C09C 2200/401* (2013.01)
USPC .......................... 106/426; 106/31.6; 106/415

(58) Field of Classification Search
USPC .................................................. 106/31.6, 426
See application file for complete search history.

(56) References Cited

U.S. PATENT DOCUMENTS

| | | | | |
|---|---|---|---|---|
| 4,544,415 | A * | 10/1985 | Franz et al. .................... | 106/417 |
| 5,423,912 | A * | 6/1995 | Sullivan et al. ............... | 106/417 |
| 5,456,749 | A | 10/1995 | Iwasa et al. | |
| 5,472,491 | A * | 12/1995 | Duschek et al. .............. | 106/418 |
| 6,176,918 | B1 | 1/2001 | Glausch et al. | |
| 7,172,812 | B2 | 2/2007 | Greiwe et al. | |
| 2002/0096087 | A1 * | 7/2002 | Glausch ........................ | 106/415 |
| 2004/0226480 | A1 | 11/2004 | Greiwe et al. | |
| 2009/0249979 | A1 | 10/2009 | Kaupp et al. | |

FOREIGN PATENT DOCUMENTS

| | | |
|---|---|---|
| DE | 19639783 A1 | 4/1998 |
| EP | 0141174 A1 | 5/1985 |
| WO | 94/01498 A1 | 1/1994 |
| WO | 98/13426 A1 | 4/1998 |
| WO | 99/57204 A1 | 11/1999 |
| WO | 2007/098887 A2 | 9/2007 |

OTHER PUBLICATIONS

International Search Report for PCT/EP2011/005125 (Jan. 11, 2012).

Dr. R. Ruger et al., "Cosmetic Formulations Containing Special Effect Pigments", Research Disclosure Database No. 471001 (Jul. 2003).

Dr. R. Ruger et al., "Optically Variable Pigments in Plastics and Plastic Articles", Research Disclosure Database No. 472005 (Aug. 2003).

* cited by examiner

*Primary Examiner* — Veronica F Faison
(74) *Attorney, Agent, or Firm* — Millen, White, Zelano & Branigan, P.C.

(57) ABSTRACT

The present invention relates to effect pigments based on substrates having an outer coating comprising metal oxide, hydroxide and/or oxide hydrate and at least one organic coupling agent.

13 Claims, No Drawings

US 8,821,627 B2

EFFECT PIGMENTS WITH AN OUTER PROTECTIVE COATING COMPRISING ZINC OXIDE

The present invention relates to effect pigments based on substrates having an outer coating comprising A) zinc oxide, hydroxide and/or oxide hydrate, B) at least one metal oxide, hydroxide and/or oxide hydrate, and C) at least one organic coupling agent, a process for the preparation of such effect pigments, and to the use of such effect pigments.

Effect pigments are employed in a multiplicity of different application media, such as, for example, paints, coatings and plastics, where quite different requirements are made. Primarily, the effect pigments should be compatible with the application medium surrounding them, but must also be sufficiently stable for in some cases long periods. Plastic parts and surface-coating layers for outdoor applications are often subjected to extreme weather conditions and long-lasting, intense exposure to light over an extended time, resulting in ageing of the materials.

Effect pigments having titanium dioxide, iron oxide or other metal oxide layers sometimes show considerable changes in their properties due to the action of external influences, such as light or water. This is evident from discoloration, embrittlement and reduced mechanical and chemical stability In order to circumvent these problems, it has been proposed to subject effect pigments to an aftertreatment with the aim of improving the applicational properties. The aftertreatment frequently involves coating the effect pigments with polymers, different metal oxides/hydroxides and/or silanes. For example, WO 99/57204 describes the use of reactive surface modifiers for the preparation of effect pigments which exhibit good orientation and distribution in surface coatings and WO 94/01498 describes the use of three layers of metal oxides applied on top of each other. WO 98/13426, DE 103 48 174 and U.S. Pat. No. 4,544,415 describe pigments with layers comprising metal oxides and monomeric, oligomeric and polymeric coupling agents. However, the pigments according to the state of the art are disadvantageous with respect to photostability and/or compatibility with the application medium.

Thus, there continues to be a demand for improved effect pigments and a simple preparation of such effect pigments.

Surprisingly, it has been found that effect pigments according to the invention show improved stability.

Therefore, subject of the invention are effect pigments having an outer coating comprising A) zinc oxide, hydroxide and/or oxide hydrate, B) at least one metal oxide, hydroxide and/or oxide hydrate, and C) at least one organic coupling agent, and wherein the outer coating has a carbon content of ≥0.5 by weight based on the total weight of effect pigment, a process for the preparation of such effect pigments, and to the use of such effect pigments It is a main advantage of the invention that the new outer coatings provide effect pigments with improved stability, i.e. weather-resistance which is important for outdoor uses. Preferred variants of the invention advantageously provide a possibility to protect effect pigments with an outer coating that does not influence chroma, luster and color of base effect pigments. This is especially important for effect pigments having high chroma, high luster and pure colour, e.g. pearlescent pigments showing a pure sliver white pearl effect.

Effect pigments according to the invention are preferably selected from pearlescent pigments, interference pigments, metal-effect pigments, multi-layer pigments with transparent, semi-transparent and/or opaque layers, goniochromatic pigments, holographic pigments, coated or uncoated BiOCl-flakes and/or LCP (liquid crystal pigments). Preferred pigments are pearlescent pigments, interference pigments, multi-layer pigments with transparent, semi-transparent and/or opaque layers, and goniochromatic pigments, especially pearlescent pigments and interference pigments.

Such pigments usually have a multilayered structure and are based on substrates, which can in principle have any shape; they are preferably in flake form. Suitable substrates are $TiO_2$, synthetic or natural mica, glass flakes, metal flakes, $SiO_2$ flakes, $Al_2O_3$ flakes or iron oxide flakes. The metal flakes can consist, inter alia, of aluminium, titanium, bronze, steel or silver, preferably aluminium and/or titanium. The metal flakes may have been passivated by appropriate treatment. Particularly, synthetic or natural mica, glass flakes, $SiO_2$ flakes, $Al_2O_3$ flakes or iron oxide flakes are used, especially synthetic or natural mica or glass flakes.

In a preferred embodiment, the substrate is coated with one or more transparent, semitransparent and/or opaque layers comprising metal oxides, metal oxide hydrates, metal suboxides, metals, metal fluorides, metal nitrides, metal oxynitrides or mixtures of these materials. Preferably, the substrate is partially or totally encased with these layers.

The metal oxide, metal oxide hydrate, metal suboxide, metal, metal fluoride, metal nitride or metal oxynitride layers or the mixtures thereof can have low refractive indexes (refractive index<1.8) or high refractive indexes (refractive index≥1.8, preferably>2.0). Suitable metal oxides and metal oxide hydrates are all metal oxides and metal oxide hydrates known to the person skilled in the art, such as, for example, aluminium oxide, aluminium oxide hydrate, silicon oxide, silicon oxide hydrate, iron oxide, tin oxide, cerium oxide, zinc oxide, zirconium oxide, chromium oxide, titanium oxide, in particular titanium dioxide, titanium oxide hydrate and mixtures thereof, such as, for example, ilmenite or pseudobrookite. Metal suboxides which can be employed are, for example, titanium suboxides. Suitable metals are, for example, chromium, aluminium, nickel, silver, gold, titanium, copper or alloys, and a suitable metal fluoride is, for example, magnesium fluoride. Metal nitrides or metal oxynitrides which can be employed are, for example, the nitrides or oxynitrides of the metals titanium, zirconium and/or tantalum. Preference is given to the application of metal oxide, metal, metal fluoride and/or metal oxide hydrate layers and very particularly preferably metal oxide and/or metal oxide hydrate layers to the support. Furthermore, multilayered structures comprising high- and low-refractive-index metal oxide, metal oxide hydrate, metal or metal fluoride layers may also be present, preferably with high- and low-refractive-index layers alternating. Particular preference is given to layer packages comprising a high-refractive-index layer and a low-refractive-index layer, it being possible for one or more of these layer packages to be applied to the substrate. The sequence of the high- and low-refractive-index layers can be matched to the substrate here in order to include the substrate in the multilayered structure. In a further embodiment, the metal oxide, metal oxide hydrate, metal suboxide, metal, metal fluoride, metal nitride or metal oxynitride layers can be mixed or doped with colorants or other elements. Suitable colorants or other elements are, for example, organic or inorganic coloured pigments, such as coloured metal oxides, for example magnetite or chromium oxide, or coloured pigments, such as, for example, Berlin Blue, ultramarine, bismuth vanadate, Thénard's Blue, or alternatively organic coloured pigments, such as, for example, indigo, azo pigments, phthalocyanines or alternatively Carmine Red, or elements, such as, for example, yttrium or antimony. Effect pigments comprising these layers exhibit a wide variety of colours with respect to their mass tone and can in many cases exhibit an angle-dependent change in the colour (colour flop) due to interference. Examples and embodiments of the above-mentioned materials and pigment structures are also given, for example, in Research Disclosures RD 471001 and RD 472005, the disclosure content of which is incorporated herein by way of reference. Pigments of this kind are for example commercially available under the names Iriodin® and Pyrisma® (manufacturer: Merck KGaA Darmstadt).

Preferably, the final layer of a layer package comprising high- and low-refractive-index layers is a high-refractive-index layer, i.e. $TiO_2$, titanium suboxides, iron oxides, and/or mixtures of these oxides such as ilmenite or pseudobrookite. Especially preferred is $TiO_2$. $TiO_2$ is preferably in rutile modification, but may also be in anatase modification. Effect pigments having the following base structure of coated substrates are preferred, wherein $TiO_2/Fe_2O_3$ means a layer comprising $TiO_2$ and $Fe_2O_3$ as a mixture and/or as a mixed oxide, i.e. pseudobrookite, and pseudobrookite and/or a $TiO_2/Fe_2O_3$ mixture may optionally be donated with $Al_2O_3$: Oxides in brackets mean optionally used oxides. Preferably $SnO_2$ is applied prior to $TiO_2$ formation to facilitate rutilisation.

flake substrate+$(SiO_2)$+$TiO_2$ (rutile)
flake substrate+$(SiO_2)$+$SiO_2$+$TiO_2$ (rutile)
flake substrate+$(SiO_2)$+$TiO_2$ (rutile)+$SiO_2$+$TiO_2$ (rutile)
flake substrate+$(SiO_2)$+$TiO_2$ (anatase)+$SiO_2$+$TiO_2$ (anatase)
flake substrate+$(SiO_2)$+$TiO_2/Fe_2O_3$+$SiO_2$+$TiO_2$+$TiO_2/Fe_2O_3$
flake substrate+$(SiO_2)$+$TiO_2/Fe_2O_3$+$SiO_2$+$TiO_2/Fe_2O_3$.

Effect pigments having the following structure are especially preferred:
mica+$(SnO_2)$+$TiO_2$
mica+$TiO_2/Fe_2O_3$
mica+$(SnO_2)$+$TiO_2$+$SiO_2$+$TiO_2$
mica+$TiO_2/Fe_2O_3$
mica+$TiO_2/Fe_2O_3$+$SiO_2$+$TiO_2$
mica+$TiO_2/Fe_2O_3$+$SiO_2$+$TiO_2/Fe_2O_3$
mica+$TiO_2/Fe_2O_3$+$SiO_2$+$TiO_2$+$TiO_2/Fe_2O_3$
mica+$(SnO_2)$+$TiO_2$+$SiO_2$+$TiO_2/Fe_2O_3$
mica+$TiFe_2O_5$
$Al_2O_3$-flakes+$TiO_2$
$SiO_2$-flakes+$TiO_2$
glass flakes+$TiO_2$
glass flakes+$SiO_2$+$TiO_2$
glass flakes+$SiO_2$+$TiO_2$+$SiO_2$
glass flakes+$TiO_2$+$SiO_2$+$TiO_2$
glass flakes+$(SiO_2)$+$TiO_2/Fe_2O_3$
glass flakes+$(SiO_2)$+$TiO_2/Fe_2O_3$+$SiO_2$+$TiO_2$
glass flakes+$(SiO_2)$+$TiO_2/Fe_2O_3$+$SiO_2$+$TiO_2/Fe_2O_3$
glass flakes+$(SiO_2)$+$TiO_2/Fe_2O_3$+$SiO_2$+$TiO_2$+$TiO_2/Fe_2O_3$
glass flakes+$(SiO_2)$+$TiO_2$+$SiO_2$+$TiO_2/Fe_2O_3$
glass flakes+$(SiO_2)$+$TiFe_2O_5$ Particularly, effect pigments having the following structure are preferred:
synthetic mica+$TiO_2$
synthetic mica+$TiO_2$+$SiO_2$+$TiO_2$
synthetic mica+$TiO_2/Fe_2O_3$+$SiO_2$+$TiO_2$
synthetic mica+$(SnO_2)$+$TiO_2$ (rutile)
synthetic mica+$(SnO_2)$+$TiO_2$ (rutile)+$SiO_2$+$TiO_2$ (rutile)
synthetic mica+$TiO_2$ (anatase)+$SiO_2$+$TiO_2$ (anatase)

The thickness of the metal oxide, metal oxide hydrate, metal suboxide, metal, metal fluoride, metal nitride or metal oxynitride layers or a mixture thereof is usually from 3 to 300 nm and in the case of the metal oxide, metal oxide hydrate, metal suboxide, metal fluoride, metal nitride or metal oxynitride layers or a mixture thereof is preferably from 20 to 200 nm. The thickness of the metal layers is preferably from 4 to 50 nm.

The size of the substrate and thus of the effect pigments is not crucial per se. Flake-form substrates and/or flake-form substrates coated with one or more transparent, semitransparent and/or opaque layers generally have a thickness of between 0.05 and 5 μm, in particular between 0.1 and 4.5 μm. The dimension in the length or width is usually between 1 and 250 μm, preferably between 2 and 200 μm and in particular between 2 and 100 μm.

The essential feature of the effect pigments of the invention is an outer coating on top of the above-mentioned coated or uncoated substrates, i.e. on the above-mentioned layer packages. This essential outer coating comprises A) zinc oxide, hydroxide and/or oxide hydrate, B) at least one metal oxide, hydroxide and/or oxide hydrate, and C) at least one organic coupling agent, and the outer coating has a carbon content of ≥5 by weight based on the total weight of effect pigment. The compounds A) and B) may also be present as mixed, preferably hydrated, oxidic compounds of the relevant metals.

Preferably the outer coating consists of A) zinc oxide, hydroxide and/or oxide hydrate, B) at least one metal oxide, hydroxide and/or oxide hydrate, and C) at least one organic coupling agent, and wherein the outer coating has a carbon content of ≥5%, by weight based on the total weight of effect pigment.

An essential component of the outer coating according to the invention is an oxidic compound of zinc A), i.e. zinc oxide, zinc hydroxide and/or zinc oxide hydrate. Preferably, a combination of two or three of these compounds may be present in the outer coating, especially, zinc hydroxide and/or zinc oxide hydrate. It is also possible to use phosphoric acid metal compounds in combination with these zinc compounds for improving mechanical stability of finished pigments.

The proportion of oxidic compounds of zinc in the outer coating is preferably ≥0.1% by weight, calculated as ZnO based on the total weight of effect pigment, especially 0.1 to 5%. In particular, the proportion of oxidic compounds of zinc in the outer coating is ≥0.3% by weight, preferably 0.3 to 5%, especially 0.3 to 3%.

Another essential component of the outer coating according to the invention is an oxidic metal compound B), i.e. at least one metal oxide, hydroxide and/or oxide hydrate. Preferably, a combination of two or three of these compounds may be present in the outer coating, especially at least one metal hydroxide and/or oxide hydrate.

Preferably, the oxidic metal compounds B) are selected from compounds of elements zirconium, cerium, silicon, aluminium, calcium, and mixtures thereof.

Preferred are zirconium, cerium, silicon, aluminium, and mixtures thereof, especially zirconium, silicon, aluminium, and mixtures thereof.

It is particularly preferred that aluminium and/or silicon metal oxide, hydroxide and/or oxide hydrate are used in combination with zinc oxide, hydroxide and/or oxide hydrate. Especially effect pigments based on synthetic mica are advantageously covered with an outer coating comprising oxides, hydroxides and/or oxide hydrates of zinc and aluminum or oxides, hydroxides and/or oxide hydrates of zinc and silicon.

Also preferred are combinations of zinc oxide, hydroxide and/or oxide hydrate with at least two metal oxides, hydroxides and/or oxide hydrates of the elements selected from zirconium, cerium, silicon, aluminium, and calcium. Particularly, combinations of zinc oxide, hydroxide and/or oxide hydrate with at least three oxides, hydroxides and/or oxide hydrates of zirconium, cerium, silicon, and aluminium are suitable for the invention. Especially, a combination of oxidic compounds of zinc with oxidic compounds of zirconium, silicon, and aluminium may be used with advantage. Also, a combination of oxidic compounds of zinc with oxidic compounds of zirconium, cerium, silicon, and aluminium may be used with advantage.

In particular, the proportion of at least one metal oxide, hydroxide and/or oxide hydrate of the elements selected from zirconium, cerium, silicon, aluminium, calcium, and mixtures thereof in the outer coating is ≥0.1% by weight, calculated as metal oxide(s) based on the total weight of effect pigment, preferably in the range of 0.1 to 5% by weight based on the total weight of effect pigment. In particular, the proportion of oxidic compounds B) in the outer coating is ≥0.2% by weight, preferably 0.2 to 5%, especially 0.5 to 3%. These proportions ranges apply to compounds of a single element as well as to mixtures of compounds of different elements.

A further essential component of the outer coating according to the invention is at least one organic coupling agent C). Preferably, the outer coating comprises at least two, preferably at least three organic coupling agents. The at least one organic coupling agent is preferably anchored within the outer coating and/or to the oxidic metal compounds A) and/or B) of the outer coating and/or to the substrate, i.e. via oxygen bridges.

Organic coupling agents suitable for the invention are organosilanes, -aluminates, -titanates and/or zirconates of the general formula $$X_{4-n-m}Z-R_n(-B-Y)_m$$

where X=OH, halogen, alkoxy, aryloxy
Z=Si, Al, Ti, Zr
R=alkyl, phenyl or hydrogen
B=organic, at least bifunctional group (alkylene, alkyleneoxyalkylene)
Y=amino, substituted amino, hydroxyl, hydroxyalkyl, siloxane, acetoxy, isocyanate, vinyl, acryloyl, epoxide, epoxypropyloxy, imidazole or ureido group
n, m=0,1,2,3 where n+m≤3.

The organic coupling agents are preferably compounds where Z=Si. The organic coupling agents preferably comprise alkoxysilane groups, which can be converted into corresponding hydroxyl groups by hydrolytic reaction conditions. The latter can effect anchoring via oxygen bridges. In addition, it is also possible to employ mixtures of various coupling reagents, which can be applied as a mixture or individually. By appropriate choice of the coupling agents, the effect pigments of the invention can be matched to various application systems.

The organic coupling agent can be matched to the use medium through the choice of suitable functional groups. In addition, additional bonds to the medium can be formed via the organic coupling agent through reaction of the functional groups with corresponding functionalities in the application media. In a particular embodiment, the surface of the effect pigments according to the invention is modified by means of a combination, matched to the use medium, of mixtures of various organic coupling agents. The hydrophobicity of the effect pigments surface can be matched by integration of alkyl-containing organic coupling agents, such as, for example, alkylsilanes. Besides the organosilanes, preference is also given to the use of hydrolysates and homogeneous and heterogeneous oligomers and/or polymers thereof, which can likewise be employed alone or in combination with silanes, zirconates, aluminates, zircoaluminates and/or carboxyzircoaluminates as organic coating. Particular preference is given to mixtures of various organic coupling reagents, in particular with functional groups Y which are different from one another, which ensures a particular range of applications. Especially preferred are mixtures of organosilanes, in particular mixtures comprising at least two, preferably at least three, organosilanes having different functional groups.

Examples of organosilanes are propyltrimethoxysilane, propyltriethoxysilane, isobutyltrimethoxysilane, hexyltrimethoxysilane, n-octyltrimethoxysilane, i-octyltrimethoxysilane, n-octyltriethoxysilane, n-decyltrimethoxysilane, dodecyltrimethoxysilane, hexadecyltrimethoxysilane, vinyltrimethoxysilane. Suitable oligomeric, alcohol-free organosilane hydrolysates are, inter alia, the products marketed by Sivento under the trade name "Dynasylan®", such as, for example, Dynasylan HS 2926, Dynasylan HS 2909, Dynasylan HS2907, Dynasylan HS 2781, Dynasylan HS 2776, Dynasylan HS 2627. In addition, oligomeric vinylsilane and also aminosilane hydrolysate are suitable as organic coating. Functionalised organosilanes are, for example, 3-aminopropyltrimethoxysilane, 3-methacryloxytrimethoxysilane, 3-methacryloxypropyltrimethoxysilane, 3-glycidyloxypropyltrimethoxysilane, beta-(3,4-epoxycyclohexyl)ethyltrimethoxysilane, gamma-isocyanatopropyltrimethoxysilane, 1,3-bis(3-glycidoxypropyl)-1,1,3,3,-tetramethyldisiloxane, ureidopropyltriethoxysilane, preferably 3-aminopropyltrimethoxysilane, 3-methacryloxytrimethoxysilane, 3-methacryloxypropyltrimethoxysilane, 3-glycidyloxypropyltrimethoxysilane, beta-(3,4-epoxycyclohexyl)ethyltrimethoxysilane, gamma-isocyanatopropyltrimethoxysilane. Examples of polymeric silane systems are described in WO 98/13426 and marketed, for example, by Sivento under the trade name Hydrosil®.

Especially preferred are alkylsilanes, epoxysilanes, (meth)acrylsilanes, and/or aminosilanes, especially mixtures of such silanes. Particularly preferred are hexyltrimethoxysilane, n-octyltrimethoxysilane, n-octyltriethoxysilane, n-decyltrimethoxysilane, 3-aminopropyltrimethoxysilane, 3-methacryloxytrimethoxysilane, 3-methacryloxypropyltrimethoxysilane, 3-glycidyloxypropyltrimethoxysilane, and/or beta-(3,4-epoxycyclohexyl)ethyltrimethoxysilane, especially mixtures of such silanes, especially mixtures of at least more than three of these silanes.

It is essential for effect pigments of the invention to have a carbon content of ≥0.5% by weight based on the total weight of effect pigment. The upper limit should be fixed with the quantity that starts to interfere the effect of the pigment. Generally speaking, is around 5%. Preferably, the carbon content is in the range of 0.5-3.0%, especially of 0.5-1.5%, by weight based on the total weight of effect pigment. The carbon content is measured by means of elemental analysis on the dry pigment, preferably by CH analyzer RC612 by LECO Corporation.

The outer coating may not be a layered structure but a mixture of oxidic compounds. Advantageously, the outer coating shows an inhomogeneous distribution of compounds, especially of oxidic compounds. Preferably, the concentration of oxidic zinc compounds A) has a maximum at the outer surface of the effect pigment and decreases towards the base substrate. The other oxidic compounds B) may be evenly spread throughout the outer coating. Preferably the concentrations of singular or all oxidic compounds B) may decrease or increase starting from the effect pigment surface. In particular, a decrease of concentration of aluminium and/or silicon oxidic compounds starting from the effect pigment surface is preferred. If wanted the outer coating may be structured in such way that it has a multilayered structure. Preferably, the concentration of organic coupling agents C)

has a maximum at the outer surface of the effect pigment and decreases towards the base substrate.

Preferably the effect pigments of the invention comprise ≥0.3 weight-%, especially 0.3-5.0 weight-%, preferably 0.3-3.0 weight-%, of an oxidic zinc compound A) calculated as ZnO, and ≥0.2 weight-%, especially 0.2-5.0 weight-%, preferably 0.5-3.0 weight-%, of oxidic metal compounds B) calculated as oxides, and a carbon content of ≥0.5% by weight, especially 0.5-3.0%, preferably of 0.5-1.5%.

In a particularly preferred variant of the invention, the effect pigments comprise 0.3-3.0 weight-% of an oxidic zinc compound A) calculated as ZnO, and 0.5-3.0 weight-% of oxidic metal compounds B) calculated as oxides, and a carbon content of 0.5-1.5%.

Pigments consisting of 0.3-3.0 weight-% of an oxidic zinc compound A) calculated as ZnO, and 0.5-3.0 weight-% of oxidic metal compounds B) calculated as oxides, and a carbon content of 0.5-1.5% are especially preferred.

All weight-% are based on the total weight of effect pigment.

An especially preferred variant of the invention are effect pigments having an outer coating consisting of an oxidic zinc compound A), of at least one of zirconium, silicon, and aluminium oxidic compounds B), and at least two, preferably at least three organic silanes, wherein the carbon content of the effect pigment is in the range of 0.5-3.0%, and wherein the outer coating covers coated substrates having the following structures:
synthetic mica+$TiO_2$
synthetic mica+$TiO_2$+$SiO_2$+$TiO_2$
synthetic mica+$TiO_2$/$Fe_2O_3$+$SiO_2$+$TiO_2$
synthetic mica+($SnO_2$)+$TiO_2$ (rutile)
synthetic mica+($SnO_2$)+$TiO_2$ (rutile)+$SiO_2$+$TiO_2$ (rutile)
synthetic mica+$TiO_2$ (anatase)+$SiO_2$+$TiO_2$ (anatase).

Such preferred effect pigments especially comprise 0.3-3.0 weight-% of an oxidic zinc compound A), 0.5-3.0 weight-% of at least one of zirconium, silicon, and aluminium oxidic compounds B), and organic silanes selected from hexyltrimethoxysilane, n-octyltrimethoxysilane, n-octyltriethoxysilane, n-decyltrimethoxysilane, 3-aminopropyltrimethoxysilane, 3-methacryloxytrimethoxysilane, 3-methacryloxypropyltrimethoxysilane, 3-glycidyloxypropyltrimethoxysilane, and/or beta-(3,4-epoxycyclohexyl)ethyltrimethoxysilane, especially at least three of these silanes.

The object of the present invention is furthermore achieved by a process for the preparation of effect pigments, comprising applying by wet-chemical methods and/or by the sol-gel process an outer coating comprising A) zinc oxide, hydroxide and/or oxide hydrate, B) at least one metal oxide, hydroxide and/or oxide hydrate, and C) at least one organic coupling agent to a substrate and subsequently drying the coated substrate.

Preferably flake-form substrates selected from synthetic or natural mica, glass flakes, $SiO_2$ flakes, $Al_2O_3$ flakes or iron oxide flakes, preferably synthetic or natural mica or glass flakes are used. Especially, flake-form substrates coated with one or more, optionally alternating, layers of metal compounds selected from metal oxides, metal oxide hydrates, metal suboxides, metals, metal fluorides, metal nitrides, metal oxynitrides, and mixtures thereof as described in the foregoing are used The application of the outer coating according to the invention is preferably carried out by wet-chemical methods. Suitable solvents are organic solvents, water or mixtures thereof. water is preferably used. In the case of application by wet-chemical methods, coating with the corresponding metal oxides, hydroxides and/or oxide hydrates A) and B) and organic coupling agents C) takes place.

In particular, the process of the invention comprises the steps of a) suspending the substrates in a solvent b) adding one or more zinc salts, at least one or more, preferably at least two, salts of zirconium, cerium, silicon, aluminium, and/or calcium, and at least one, preferably at least two, especially at least three, organic coupling agent, and c) drying the coated substrates, wherein the metal compounds and the organic coupling agents are deposited onto the substrates and the metal salts are deposited in full or part as metal oxides, hydroxides or oxide hydrates.

The present process may advantageously be conducted with the preferred substrates and compounds for A), B) and C) described in the foregoing, especially with substrates having the following structures:
synthetic mica+$TiO_2$
synthetic mica+$TiO_2$+$SiO_2$+$TiO_2$
synthetic mica+$TiO_2$/$Fe_2O_3$+$SiO_2$+$TiO_2$
synthetic mica+($SnO_2$)+$TiO_2$ (rutile)
synthetic mica+($SnO_2$)+$TiO_2$ (rutile)+$SiO_2$+$TiO_2$ (rutile)
synthetic mica+$TiO_2$ (anatase)+$SiO_2$+$TiO_2$ (anatase);
and with at least one compound of the elements of zirconium, silicon, and aluminium to form oxidic compounds B), and organic silanes selected from hexyltrimethoxysilane, n-octyltrimethoxysilane, n-octyltriethoxysilane, n-decyltrimethoxysilane, 3-aminopropyltrimethoxysilane, 3-methacryloxytrimethoxysilane, 3-methacryloxypropyltrimethoxysilane, 3-glycidyloxypropyltrimethoxysilane, and/or beta-(3,4-epoxycyclohexyl)ethyltrimethoxysilane, especially at least three of these silanes To this end, the substrates are suspended in a solvent, preferably water, and solutions of the metal salts and organic coupling agents are added. The components of the outer coating are precipitated onto the substrates here. Suitable starting compounds for metal oxides, hydroxides and/or oxide hydrates A) and B) are the corresponding halides, nitrates and/or sulfates; use is preferably made of the corresponding halides and/or nitrates. Phosphoric acid or sodium salt of phosphoric acid may be added in combination with zinc salts.

The amount of starting compounds and the precipitation conditions of the respective material, such as, for example, pH or temperature, can be set and optimised in a manner known to the person skilled in the art. Preferably, the reaction temperature is in the range of 30 to 100° C., and the pH is in the range of 1.5 to 11.

The reaction for application of the outer coating is preferably carried out over a period of 10 to 120 minutes, but can also be extended as desired. The effect pigment obtained is worked up and isolated by methods familiar to the person skilled in the art, for example by filtration, drying and sieving.

Owing to the improved applicational properties, the effect pigments comprising an outer coating according to the invention are suitable for a multiplicity of applications. The invention thus furthermore relates to the use of such effect pigments for the pigmenting of cosmetics, paints, coatings, printing inks, plastics, films, in security applications, for laser marking, in thermal protection or for colouring seed. The effect pigments can be incorporated into the respective application media by all methods known to the person skilled in the art.

Printing inks comprising effect pigments in accordance with the present invention are suitable for all known printing methods, such as, for example, screen printing, flexographic printing, gravure printing or offset printing. The effect pigments according to the invention are preferably employed in paints which, owing to the particular stability of the effect pigments, are suitable for all indoor and outdoor applications, for example automotive paints, such as water-borne coatings. The effect pigments of the invention may be used most advantageously in automotive paints. All plastics and films known to the person skilled in the art can advantageously be pigmented with effect pigments according to the invention, where the binding of the effect pigments can take place either purely physically by mixing or chemically through reaction of corresponding functional groups in the outer coating with the plastic.

The effect pigments according to the invention are likewise suitable for use in blends with organic dyes and/or pigments, such as, for example, transparent and opaque white, coloured and black pigments, and with flake-form iron oxides, organic pigments, holographic pigments, LCPs (liquid crystal polymers) and conventional transparent, coloured and black lustre pigments based on metal oxide-coated flakes based on mica, glass, $Al_2O_3$, $Fe_2O_3$, $SiO_2$, etc. The effect pigments according to the invention can be mixed with commercially available pigments and fillers in any ratio.

Fillers which may be mentioned are, for example, natural and synthetic mica, nylon powder, pure or filled melamine resins, talc, glasses, kaolin, oxides or hydroxides of aluminium, magnesium, calcium, zinc, BiOCl, barium sulfate, calcium sulfate, calcium carbonate, magnesium carbonate, carbon, and physical or chemical combinations of these substances. There are no restrictions regarding the particle shape of the filler. It can be, for example, flake-form, spherical or needle-shaped in accordance with the requirements.

The following examples are intended to explain the invention in greater detail, but without restricting it.

EXAMPLES

Example 1

10% slurry of Pyrisma® T30-22 (pigment/ion exchanged water 100 g/1000 g) is prepared and the temperature is raised to 55° C. with stirring. Then, the pH of the slurry is adjusted to 2.1 with HCl solution. Cerium chloride solution is added into the slurry. Next, a mixture of zirconium oxychloride, sodium hypophosphite solution and HCl solution is simultaneously added dropwise for 60 minutes. In the meantime, the pH is kept at 2.1 with NaOH solution. After 30 minutes keeping, the pH is adjusted to 5.5 with NaOH solution and aluminum chloride solution and sodium hydrate solution are simultaneously added dropwise at pH 5.5. Next, the pH is adjusted to 6.2 and zinc chloride solution and sodium hydrate solution are simultaneously added dropwise at pH 6.2. Then, a mixture of methacryl silane, epoxy silane, alkyl silane is added into the solution and it is kept for 15 minutes. Afterwards, the pH is raised to 7.0 with NaOH solution and it is kept for 1 hour. The slurry is filtrated and washed with ion exchanged water. The cake is dried at 130° C. for 2.5 hrs. The dried sample is sieved by 32 μm sieve.

The effect pigment comprises 1.1% of carbon content, total 2.5% of $ZrO_2/Ce_2O_3/Al_2O_3$ and 0.5% of ZnO. All percentages are by weight and based on the total weight of effect pigment. The carbon content is measured by CH analyzer RC612 by LECO Corporation.

Example 2 (Comparison)

10% slurry of Pyrisma® T30-22 (pigment/ion exchanged water 100 g/1000 g) is prepared and the temperature is raised to 55° C. with stirring. Then, the pH of the slurry is adjusted to 2.1 with HCl solution. Cerium chloride solution is added into the slurry. Next, a mixture of zirconium oxychloride, sodium hypophosphite solution and hydrochloride solution is simultaneously added dropwise for 60 minutes. In the meantime, the pH is kept at 2.1 with NaOH solution. After 30 minutes keeping, the pH is raised to 7.0 with NaOH solution and is kept for 15 minutes. Finally, amino silane is added into the solution and it is kept for 60 minutes. The slurry is filtrated and washed with ion exchanged water. The cake is dried at 130° C. for 2.5 hrs. The dried sample is sieved by 32 μm sieve.

The effect pigment comprises 0.2% of carbon content, and total 2.7% of $ZrO_2/Ce_2O_3$. All percentages are by weight and based on the total weight of effect pigment. The carbon content is measured by CH analyzer RC612 by LECO Corporation.

Example 3 (Comparison)

10% slurry of Pyrisma® T30-22 (pigment/ion exchanged water 100 g/1000 g) is prepared and the temperature is raised to 55° C. with stirring. Then the pH of the slurry is adjusted to 2.1 with HCl solution. Cerium chloride solution is added into the slurry. Then, a mixture of zirconium oxychloride, sodium hypophosphite solution and hydrochloride solution is simultaneously added dropwise for 60 minutes. The pH is kept at 2.1 with NaOH solution. After keeping for 30 minutes, the pH is adjusted to 5.5 with NaOH solution and aluminum chloride solution and sodium hydrate solution are simultaneously added dropwise at pH 5.5. After the pH is adjusted to 6.2, zinc chloride solution and sodium hydrate solution are simultaneously added dropwise at pH 6.2. After 15 minutes keeping, the pH is raised to 7.0 with NaOH solution and it is kept for 15 minutes. Finally, amino silane is added into the solution and it is kept for 60 minutes. The slurry is filtrated and washed with ion exchanged water. The cake is dried at 130° C. for 2.5 hours. The dried sample is sieved by 32 μm sieve.

The effect pigment comprises 0.2% of carbon content, total 2.5% of $ZrO_2/Ce_2O_3/Al_2O_3$ and 0.5% of ZnO. All percentages are by weight and based on the total weight of effect pigment. The carbon content is measured by CH analyzer RC612 by LECO Corporation.

Example 4 (Comparison)

10% slurry of Pyrisma® T30-22 (pigment/ion exchanged water 100 g/1000 g) is prepared and the temperature is raised to 55° C. with stirring. Then the pH of slurry is adjusted to 2.1 with HCl solution. Cerium chloride solution is added into the slurry. Then, a mixture of zirconium oxychloride, sodium hypophosphite solution and hydrochloride solution is simultaneously added dropwise for 60 minutes. The pH is kept at 2.1 with NaOH solution. After 30 minutes keeping, the pH is adjusted to 5.5 with NaOH solution and aluminum chloride solution and sodium hydrate solution are simultaneously added dropwise at pH 5.5. Next, the pH is adjusted to 6.2 and zinc chloride solution and sodium hydrate solution are simultaneously added dropwise at pH 6.2. After 15 minutes keeping, epoxy silane is added into the solution and it is kept for 15 minutes. The pH is raised to 7.0 with NaOH solution and it is kept for 15 minutes. Finally, amino silane is added into the solution and it is kept for 60 minutes. The slurry is filtrated and washed with ion exchanged water. The cake is dried at 130° C. for 2.5 hours. The dried sample is sieved by 32 μm sieve.

The effect pigment comprises 0.4% of carbon content, total 2.5% of $ZrO_2/Ce_2O_3/Al_2O_3$ and 0.5% of ZnO. All percentages are by weight and based on the total weight of effect pigment. The carbon content is measured by CH analyzer RC612 by LECO Corporation.

Example 5

10% slurry of Iriodin® 6103/ion exchanged water 100 g/1000 g is prepared and temperature is raised to 55° C. with stirring. Then the pH of the slurry is adjusted to 5.5 and aluminum chloride solution and sodium hydrate solution are simultaneously added dropwise. Next zinc chloride solution and sodium hydrate solution are simultaneously added dropwise at pH 5.5. The mixture of silane coupling agents, methacryl silane, epoxy silane, and alkyl silane are dropped in the slurry. Finally, the slurry pH is adjusted to 7.0 and the silane coupling agent of amino silane solution is added to the solution. After keeping it for 1 hour, the slurry is filtrated and washed with ion exchanged water. The cake is dried at 130° C. for 2.5 hours. The dried sample is sieved by 32 μm sieve.

The effect pigment comprises 0.7% of carbon content, 1.5% of $Al_2O_3$ and 1.0% of ZnO. All percentages are by weight and based on the total weight of effect pigment. The carbon content is measured by CH analyzer RC612 by LECO Corporation.

Example 6 (Comparison)

10% slurry of Iriodin® 6103/ion exchanged water 100 g/1000 g is prepared and temperature is raised to 55° C. with stirring. The pH of the slurry is adjusted to 5.5 and aluminum chloride solution and sodium hydrate solution are simultaneously added dropwise. The slurry pH is adjusted to 7.0. After keeping it for 1 hour, the slurry is filtrated and washed with ion exchanged water. The cake is dried at 130° C. for 2.5 hours. The dried sample is sieved by 32 μm sieve.

The effect pigment comprises 0% of carbon content, and 1.5% of $Al_2O_3$. All percentages are by weight and based on the total weight of effect pigment.

The carbon content is measured by CH analyzer RC612 by LECO Corporation.

Example 7 (Comparison)

10% slurry of Iriodin® 6103/ion exchanged water 100 g/1000 g is prepared and the temperature is raised to 55° C. with stirring. The pH of the slurry is adjusted to 5.5 and aluminum chloride solution and sodium hydrate solution are simultaneously added dropwise. The mixture of silane coupling agents, methacryl silane, epoxy silane, and alkyl silane are dropped to the slurry. Then the slurry pH is adjusted to 7.0 and the silane coupling agent of amino silane solution is added to the slurry. After keeping it for 1 hour, the slurry is filtrated and washed with ion exchanged water. The cake is dried at 130° C. for 2.5 hours. Finally, the dried sample is sieved by 32 μm sieve.

The effect pigment comprises 0.6% of carbon content, and 1.5% of $Al_2O_3$. All percentages are by weight and based on the total weight of effect pigment. The carbon content is measured by CH analyzer RC612 by LECO Corporation.

Example 8 (Comparison)

10% slurry of Iriodin® 6103/ion exchanged water 100 g/1000 g is prepared and temperature is raised to 55° C. with stirring. Then the pH of the slurry is adjusted to 5.5 and aluminum chloride solution and sodium hydrate solution are simultaneously added dropwise. Next zinc chloride solution and sodium hydrate solution are simultaneously added dropwise at pH5.5.

The slurry pH is adjusted to 7.0. After keeping it for 1 hour, the slurry is filtrated and washed with ion exchanged water. The cake is dried at 130° C. for 2.5 hours. Finally, the dried sample is sieved by 32 μm sieve.

The effect pigment comprises 0% of carbon content, 2.0% of ZnO, and 1.5 of $Al_2O_3$. All percentages are by weight and based on the total weight of effect pigment. The carbon content is measured by CH analyzer RC612 by LECO Corporation.

Test Examples

The pigments according to the invention and the pigments of the comparative examples are investigated by the following test methods and the results are shown in Table 1 (Pyrisma® base) and Table 2 (Iriodin® base).

Photoactivity Test

The pigment samples are incorporated into a plastic matrix, and the extent of the reduction of $Pb^{2+}$ to Pb is determined visually. The assessment of the grey coloration is carried out in accordance with ISO 105-Part A 02 (corresponds to DIN 54 001). The test scale extends from 5 (very good) to 1 (very poor).

Hot-Water Dipping Test

Hot-water resistance: ○ is good, Δ is poor, X is worst. This evaluation is from hot-water dipping test by acrylic-melamine resin of baking type is used. Test panel is prepared by 2 coat 1 bake system. Hot-water dipping test condition is 80° C. for 8 hours. After test, the whitening/wrinkling of the finish is evaluated.

Accelerated Weathering Test (SX Test)

The pigment samples are incorporated into a polymethylmethacrylate resin and tested according to DIN 11341 for 1000 hours in an Atlas Xenotest Beta+ apparatus. The color change is evaluated by visual observation in comparison to an unexposed sample. The test scale extends from 1 (very good) to 5 (very poor).

TABLE 1

| Example | Photoactivity | Hot water resistance | SX test |
|---|---|---|---|
| 1 | 4 | ○ | 0.5 |
| 2 | 3-4 | ○ | 2 |
| 3 | 3-4 | x | 2 |
| 4 | 4 | ○ | 2 |

TABLE 2

| Example | Photoactivity | Hot water resistance |
|---|---|---|
| 5 | 3-4 | ○ |
| 6 | 1-2 | Δ |
| 7 | 3 | ○ |
| 8 | 2-3 | x |

The invention claimed is:

1. Effect pigments based on substrates having an outer coating comprising A) zinc oxide, hydroxide and/or oxide hydrate, B) at least one metal oxide, hydroxide and/or oxide hydrate, and C), at least three organic coupling agents selected from alkyl silanes, epoxy silanes, (meth)acryl silanes, amino silanes, vinyl silanes and mixtures thereof and wherein the outer coating has a carbon content of ≥0.5% by weight based on the total weight of effect pigment.

2. Effect pigments according to claim 1, characterised in that at least two metal oxide, hydroxide and/or oxide hydrate of the elements selected from zirconium, cerium, silicon, aluminium, and calcium, are used in B).

3. Effect pigments according to claim 1, characterised in that the carbon content is in the range of 0.5-1.5% by weight based on the total weight of effect pigment.

4. Effect pigments according to claim 1, characterised in that the proportion of zinc oxide, hydroxide and/or oxide hydrate is ≥0.1% by weight, calculated as ZnO based on the total weight of effect pigment.

5. Effect pigments according to claim 1, characterised in that the proportion of at least one metal oxide, hydroxide and/or oxide hydrate of the elements selected from zirconium, cerium, silicon, aluminium, and calcium is ≥0.1% by weight in B), calculated as metal oxide(s) based on the total weight of effect pigment.

6. Effect pigments according to claim 1, characterised in that the proportion of metal oxides, hydroxide and/or oxide hydrate of the elements selected from zirconium, cerium, silicon, aluminium, and calcium is 0.1 to 5% by weight in B) based on the total weight of effect pigment.

7. Effect pigments according to claim 1, characterised in that flake-form substrates selected from synthetic or natural mica, glass flakes, $SiO_2$ flakes, $Al_2O_3$ flakes or iron oxide flakes.

8. Effect pigments according to claim 1, characterised in that flake-form substrates coated with one or more, optionally alternating, layers of metal compounds selected from metal oxides, metal oxide hydrates, metal suboxides, metals, metal fluorides, metal nitrides, metal oxynitrides, and mixtures thereof, are used.

9. Process for the preparation of effect pigments according to claim 1 comprising applying by wet-chemical methods and/or by the sol-gel process an outer coating comprising A) zinc oxide, hydroxide and/or oxide hydrate, B) at least one metal oxide, hydroxide and/or oxide hydrate, and C) at least three organic coupling agents selected from alkyl silanes, epoxy silanes, (meth)acryl silanes, amino silanes, vinyl silanes and mixtures thereof to a substrate and subsequently drying the coated substrate.

10. Process according to claim 9, characterised in that flake-form substrates selected from synthetic or natural mica, glass flakes, $SiO_2$ flakes, $Al_2O_3$ flakes or iron oxide flakes, and wherein flake-form substrates are coated with one or more, optionally alternating, layers of metal compounds selected from metal oxides, metal oxide hydrates, metal suboxides, metals, metal fluorides, metal nitrides, metal oxynitrides, and mixtures thereof.

11. Process according to claim 9 comprising the steps of a) suspending the substrates in a solvent, b) adding one or more zinc salts, at least one or more salts of zirconium, cerium, silicon, aluminium, and/or calcium, and at least one organic coupling agent, and c) drying the coated substrates, wherein the metal compounds and the organic coupling agents are deposited onto the substrates and the metal salts are deposited in full or part as metal oxides, hydroxides or oxide hydrates.

12. A composition comprising effect pigments according to claim 1, said composition further comprising a paint, coating, printing ink, plastic or film for security applications, laser marking, thermal protection or coloring seed.

13. A composition according to claim 12, which is selected from automotive paints, plastics, and films.

* * * * *